United States Patent [19]

Gaus et al.

[11] 4,310,446

[45] Jan. 12, 1982

[54] SEALANT COMPOSITION

[75] Inventors: Frank D. Gaus; Edwin C. Klabunde, both of Sparks, Nev.

[73] Assignee: Superior Products, Inc., Sparks, Nev.

[21] Appl. No.: 162,068

[22] Filed: Jun. 23, 1980

[51] Int. Cl.³ ............................................... C08L 91/00
[52] U.S. Cl. ........................ 260/28.5 AS; 260/285 D; 260/758
[58] Field of Search ............ 260/28.5 AS, 758, 28.5 D

[56] References Cited

U.S. PATENT DOCUMENTS

| Re. 29,548 | 2/1978 | Payne et al. | 260/28.5 AS |
|---|---|---|---|
| 3,549,575 | 12/1970 | Payne et al. | 260/28.5 AS |
| 3,844,668 | 10/1974 | Winters et al. | 404/72 |
| 3,844,688 | 10/1974 | Bulkley et al. | 417/313 |
| 3,919,148 | 11/1975 | Winters et al. | 260/28.5 AS |

*Primary Examiner*—Melvyn I. Marquis
*Attorney, Agent, or Firm*—Manfred M. Warren; Robert B. Chickering; Glen R. Grunewald

[57] ABSTRACT

A joint sealant composition that is compatible with Portland cement and with asphalt including, on a weight basis, from 57% to 75% of an aromatic petroleum tar boiling between 220° C. and 650° C., from 5% to 18% of an oil-soluble ground rubber, from 10% to 17% of inorganic filler, and from 3% to 6.5% PVC with the combined weight of PVC not exceeding 23% of the composition.

3 Claims, No Drawings

SEALANT COMPOSITION

BACKGROUND OF THE INVENTION

For many years tars and pitches have been used to fill the joints and cracks between adjacent concrete slabs which are used as highway and airfield pavements and to form films or waterproofing membranes on concrete slabs or on roofs. Tars and pitches in their native form have many unsatisfactory characteristics for these purposes. For example, tars and pitches in their native form get very brittle in cold weather and tend to crack and lose the bond between the tar or pitch and the concrete slab. As a result, water penetrates the joint and freezing and thawing cycles cause the slabs to break up. In very warm weather, tars and pitches becomes soft and tacky, which in turn causes them to be extruded from the sides of a crack when exposed to vertical forces caused by traffic. In addition, tacky tars and pitches tend to stick to vehicle wheels causing a problem known as tracking, in which the tar or pitch is removed from the crack by adhering to a vehicle wheel and it is subsequently spread over the surface of the pavement by contact between the wheel and the pavement.

Native tars and pitches are particularly vulnerable when used in airfield pavements because they are soluable in jet fuel and because they liquify in the heat of a jet engine blast.

Many of the above mentioned problems have been solved by the advent of blends of coal tar pitch and vinyl chloride polymers, hereinafter PVC. Blends of coal tar pitch and PVC form rubber-like gels that remain flexible in cold weather and rubber-like in hot weather. The PVC-coal tar pitch mixture exhibits good adhesion to concrete and good cohesion so that the joint between adjacent slabs remains sealed against moisture penetration. Although the PVC-coal tar pitches known to the art are excellent sealants for cracks between concrete slabs, they do not adhere well to asphaltic pavements. Thus, for example, a joint between a concrete pavement slab and an asphaltic shoulder cannot be sealed with these otherwise excellent joint sealants because thermal expansion and contraction will cause a separation between the joint sealant and the asphaltic slab so that moisture can penetrate and damage the pavement.

PVC-coal tar mixtures made in accordance with U.S. Pat. No. 3,549,575 and its reissue U.S. Pat. No. Re. 29,548 are particularly desirable joint sealants because they are liquid phase at room temperatures and therefore can be easily heated to application temperature and introduced into a joint or crack in a highly fluid condition which causes excellent penetration and avoids the formation of bubbles or blisters within the joint. Joint sealants frequently are made more fluid by incorporating fluidizers or plasticizers within their composition. Typical of these are octylpthalates which are very expensive and, although used in small proportions, constitute a significant portion of the total cost of a joint sealant composition.

Joint sealants commonly have critical composition limitations and require blending of their ingredients to be done expertly. Accordingly, it is desirable that joint sealants be completely made in the factory so that no blending or compositing need be done in the field. It is desirable that joint sealants be in a liquid state in their shipping containers and that the joint sealants in their containers have long shelf life so that the material is liquid at the time of use. Joint sealants commonly are heated in a melter/applicator at the site where they are applied in the joints to cause certain physical and chemical reactions to take place that puts the sealants in a condition where they set up in the joint to the desirable adhesive, cohesive, rubbery form. It is desirable that joint sealants have a long pot life, specifically that they have the ability to be maintained hot in the melter where they are heated at the site of application for a relatively long period before the setting-up reactions occur. As stated above, it is very desirable for the joint sealant to be highly fluid when it is applied and it is accordingly necessary to heat the joint sealant material to a temperature that is high enough to give it the proper degree of fluidity. Ordinarily, higher temperatures accelerate the setting up reactions and accordingly very viscous joint sealant materials must be heated to a higher temperature in the melter at the site of application and have a correspondingly shorter pot life.

Joint sealants that are useful for filling joints between asphalt and concrete or for filling cracks in asphalt pavement are known. U.S. Pat. Nos. 3,844,668 and 3,919,148 describe such joint sealants. These materials are made of paving asphalt, ground rubber, and a solvent. These materials suffer from being very viscous and having a significant proportion of their total composition in the form of a solvent. The solvent evaporates from the mixture leaving the mixture less dense, the solvent creates a fire hazard in the heating of the mixture, and the solvent creates a pollution problem when it evaporates from the hot composition as it is applied and after it is in place. In addition, the prior art compositions that are useful for sealing joints in asphalt contain a high proportion of rubber which is expensive and which inherently increases the viscosity of the mixture at any given temperature.

SUMMARY OF THE INVENTION

The present invention is a composition useful to seal joints between asphalt and concrete or useful to seal joints or cracks in asphalt which avoids or greatly mitigates the problems associated with known joint sealants useful for the same purpose. Although other materials may be incorporated in the composition of this invention, it contains as essential elements the following ingredients in the proportions to one another stated below on a weight basis:

1. 55% to 75% of petroleum based aromatic tar boiling from approximate 285° C. to 650° C.
2. 5% to 18% of oil-soluble ground rubber.
3. 10% to 17% of filler.
4. 3% to 6.5% PVC.

This blend has the following desirable properties. The blend as constituted is liquid at room temperature and almost watery when heated to the normal application temperature of about 325° F. When the blend has been heated to a temperature of 325° F. it can be applied into a joint or a crack and upon cooling it sets up to a resilient rubbery material that retains its resilient rubbery qualities through all normal natural temperatures that will be encountered. Specifically, it will not become soft and tacky in the heat of summer nor will it become hard and brittle in the cold of winter.

The composition of this invention also adheres firmly both to asphalt and to concrete. The combination of high adhesion and a resilient rubbery quality results in a material that will readily expand and contract to compensate for thermal expansion and contraction on a road or deck, and it will not separate from the concrete or asphalt to which it is bonded so that joints remain waterproof.

The composition of this invention obtains its high fluidity in the package and during application, and retains its resilient rubbery qualities when applied to a joint or crack without using expensive plasticizers or fluidizers in its composition. The composition of this invention does not employ, for example, octylphthalates nor does it require any solvents to obtain its pre-application or its post-application qualities.

The composition of this invention remains a liquid indefinitely in its shipping container, and because it is a liquid when first introduced into a melter/applicator at the site of application, it has a long pot life. Specifically, compositions including PVC undergo irreversible reactions to form rigid and undesirable compounds if they are heated too long. It is characteristic of a material that is solid in its shipping container that it must be heated for a rather long time before it becomes liquid enough to be poured into a joint or crack at the job site and accordingly, the length of time the finally melted material can remain in the pot after it becomes melted and before it is applied is diminished by the amount of time necessary to effect melting. The composition of the present invention is liquid in its shipping container, thereby requiring no time for melting and additionally being in a condition where heat transfer to all portions of the material is readily accomplished.

DETAILED DESCRIPTION OF THE INVENTION

A batch of sealant material in accordance with this invention was prepared having the following composition:

| Ingredient | % by Weight |
| --- | --- |
| Aromatic petroleum based tar (5157 lbs.) | 68.61 |
| Oil-soluable rubber ground to 40 mesh (960 lbs.) | 12.77 |
| Hydrated lime (1000 lbs.) | 13.30 |
| PVC (400 lbs.) | 5.32 |

The petroleum based tar employed in the composition set forth above is what is known as an aromatic tar. The tar employed in the composition of this invention is liquid at room temperature and boils between 220° C. and 650° C.

The rubber employed in the composition of this invention is the waste product of a tire manufacturing facility. The rubber should be ground so that it is readily soluable in the composition when heated to application temperature but the mesh size at which it is ground is not critical.

The hydrated lime is employed as a filler although the function of lime in the composition of this invention is not purely to occupy volume. The function of lime in the composition of this invention is not known precisely and it acts, in addition to being a filler, largely in the manner that aggregate acts in concrete.

The PVC employed in the composition of this invention is commercially obtained PVC that is ground to a partical size such that it will dissolve in the other ingredients of the composition when heated to the application temperature.

The composition of this invention as set forth above was heated to a temperature of 325° F. in a double boiler melting unit with continuous agitation. The material was applied to clean joints which were cleaned by light sand blasting and being blown free of loose materials with compressed air. The joints were dry when the material was applied. The joints were filled in accordance with standard joint filling procedures and upon cooling the material set up to a rubbery consistency. The material did not become soft or tacky at high temperatures, nor was it picked up by vehicle tires and tracked on other portions of the pavement. The joint described above was between a slab of concrete made with Portland cement and a shoulder made of asphalt concrete.

The composition above described was also subjected to a series of tests to determine whether material is adequate to meet ASTM D3405, and Federal Specification SS-S-1401B. These tests measure at least the following properties of the material.

Penetration is a measure of how readily a force will deform the joint sealant material. It is measured by putting a predetermined perpendicular force against a standard pointed object and measuring how deeply that pointed object penetrates the cured, cast in place joint sealant material.

Another test is to measure the flow and it is accomplished by placing a sample of joint sealant material in its cast condition on a tilted surface and maintaining that material on the tilted surface for a period of 24 hours at 158° F. The best result from the flow test is if the material does not flow at all.

Another test employed is the resilience test which measures the ability of the joint sealing material to return to its original condition after it has been deformed. Resiliency also is a measure of the sealant's ability to reject incompressibles such as stones and gravel. A highly resilient joint is not penetrated by such materials.

Another test of the joint sealant material is its bond test which determines how firmly the joint sealant material adheres to the concrete or asphaltic concrete that is being sealed.

Another test is a compatibility test where the joint sealant is tested to determine how compatible it is with the material being sealed. The test determines whether there is a failure in adhesion or whether an oily exudate forms at the interface between the sealing compound and the asphaltic concrete or whether the material softens after it is in place by being dissolved in material taken up from the asphaltic concrete.

All of the foregoing tests are conducted under conditions far more severe than would be expected in normal use. For example, the bond test is accomplished by placing a specimen of joint sealant material between two concrete blocks which are pulled apart mechanically after the sealant has set. This test specimen is then cycled through at least 3 cycles where its temperature is reduced to −20° F. for 4 hours and then returned to room temperature. After each cycle the blocks are pulled apart enough to create a 50% extension in the sealant between them. The bond test is repeated after the specimen has been immersed in water for 96 hours to further determine whether moisture will interfere with the bond. Although the bond test is primarily to determine the ability of the joint sealant material to adhere to the concrete blocks, it also measures the cohesive strength of the joint sealant material and detects failure within the sealant material itself. The joint sealant composition described hereinabove was subjected to the foregoing tests and it either met or exceeded the requirements in every case.

The two primary properties of the composition of the present invention are that it is liquid phase in the container and that it is compatible with both Portland cement based concrete and asphalt based concrete. The PVC functions as PVC in joint sealant compositions useful only with Portland cement based concrete in that, at the temperature the composition is heated to prior to applying it into a crack, about 325° F., the PVC dissolves and when the composition is applied into a joint or crack and cools, the PVC forms a lattice or network that gives the ultimate composition its rubbery and resilient consistency. However, if the PVC concentration of the composition is too high, the composition will not be compatible with asphalt based concrete. Accordingly, the PVC concentration of the composition of this invention cannot be in excess of 6.5%.

It has further been found that PVC concentrations lower than 3% are not sufficient to produce the desirable characteristics of the composition. It is thought that the rubber also dissolves in the composition of this invention and forms a gel-like structure when applied in a joint or crack. However, large quantities of rubber do not make the composition incompatible either with Portland cement based concrete or with asphalt based concrete. Large quantities of rubber, however, make the consistency of the joint sealing material thick and viscous so that it does not run into the crack as a watery fluid but rather as a viscous, gummy liquid. Since cracks in asphaltic concrete are characteristically very narrow, it is a particularly important feature of this invention that the composition is very fluid. A joint sealant that is viscous or gummy when applied generally produces joints having entrapped air which are unsatisfactory because they are considered as being "bubbled" or "blistered".

To obtain the desirable qualities of the composition of this invention the combined weight of PVC plus ground rubber should not exceed 23% of the total composition.

What is claimed is:

1. A joint sealant composition comprising on a weight basis from about 57% to about 75% of an aromatic petroleum tar boiling between 220° C. and 650° C., from about 5% to about 18% of an oil-soluble ground rubber, from about 10% to about 17% of an inorganic filler, and from about 3% to about 6.5% of polyvinyl chloride, with the combined amount of rubber and polyvinyl chloride not exceeding 23% of the composition.

2. The composition of claim 1, wherein said inorganic filler is hydrated lime.

3. The composition of claim 1, wherein said hydrated filler is clay.

* * * * *